(12) United States Patent
Zhou

(10) Patent No.: US 8,476,960 B1
(45) Date of Patent: Jul. 2, 2013

(54) IDENTIFYING CIRCUIT

(75) Inventor: Hai-Qing Zhou, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/427,585

(22) Filed: Mar. 22, 2012

(51) Int. Cl.
*H03K 17/687* (2006.01)

(52) U.S. Cl.
USPC ............ 327/379; 327/389; 327/427; 327/433

(58) Field of Classification Search
None
See application file for complete search history.

(56) References Cited

U.S. PATENT DOCUMENTS

| 5,237,211 | A  | * | 8/1993  | Tanaka et al. | 327/403 |
| 5,694,065 | A  | * | 12/1997 | Hamasaki et al. | 327/108 |
| 6,218,873 | B1 | * | 4/2001  | Murr | 327/109 |
| 6,218,888 | B1 | * | 4/2001  | Otsuki | 327/419 |
| 6,300,669 | B1 | * | 10/2001 | Kinoshita | 257/566 |
| 2006/0282600 | A1 | * | 12/2006 | Wang | 710/306 |
| 2011/0148348 | A1 | * | 6/2011  | Cheng | 320/107 |

* cited by examiner

*Primary Examiner* — Tuan T Lam
(74) *Attorney, Agent, or Firm* — Altis Law Group, Inc.

(57) ABSTRACT

An identifying circuit is connected between a Universal Serial Bus (USB) interface and a controller. The identifying circuit includes first to fourth electronic switches. When a power adapter connects to the USB interface, the first and fourth electronic switches are not turned on, and the second and third electronic switches are turned on. An identification pin of the controller receives a low level signal and determines that the power adapter connects to the USB interface. When a computer connects to the USB interface, the first and fourth electronic switches are turned on, and the second and third electronic switches are not turned on. The identification pin receives a high level signal and determines that the computer is connected to the USB interface.

7 Claims, 1 Drawing Sheet

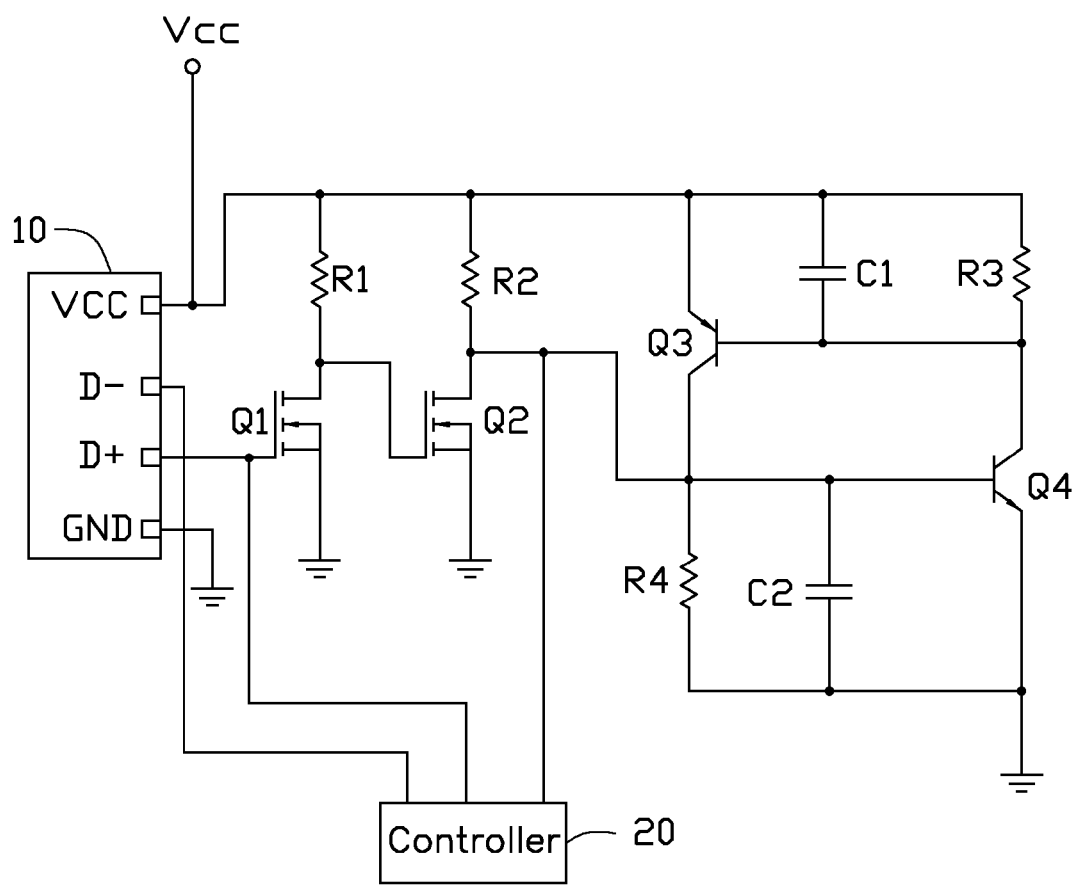

IDENTIFYING CIRCUIT

BACKGROUND

1. Technical Field

The present disclosure relates to an identifying circuit.

2. Description of Related Art

Some electronic devices can be charged or recharged through their USB interface(s). The power to charge or recharge the electronic device may be supplied from another device, such as a computer, or directly from a USB mains power adapter. When the USB interface of the electronic device is connected to a computer through the USB cable, the electronic device is considered a USB connected device and can upload or download data from the computer. If the electronic device is not able to exchange data with the connected device such as when connected to a USB mains power adapter, the electronic device may ignore or shut down the connected USB interface. As a result, a controller of the electronic device must identify whether a computer or a power adapter has been connected to the USB interface. At present, a costly special identifying chip is used to identify the type of interface connected to the electronic device.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of an exemplary embodiment of an identifying circuit.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Referring to the FIGURE, an identifying circuit is connected between a Universal Serial Bus (USB) interface 10 and a controller 20. An exemplary embodiment of the identifying circuit includes two metal oxide semiconductor field effect transistors (MOSFETs) Q1 and Q2, two bi-polar junction transistors (BJT) Q3 and Q4, four resistors R1, R2, R3, and R4, two capacitors C1 and C2.

A power pin VCC of the USB interface 10 is connected to a power supply Vcc. A positive data pin D+ and a negative data pin D− of the USB interface 10 are connected to the controller 20. As a result, when the USB interface 10 is connected to a computer to be regarded as a USB device, the power pin VCC supplies power for the USB device, and the positive data pin D+ and the negative data pin D− transmit data between the USB device and the controller 20.

A gate of the MOSFET Q1 is connected to the positive data pin D+. A source of the MOSFET Q1 is grounded. A drain of the MOSFET Q1 is connected to the power pin VCC through the resistor R1, and is further connected to a gate of the MOSFET Q2. A source of the MOSFET Q2 is grounded. A drain of the MOSFET Q2 is connected to the power pin VCC through the resistor R2, and is further connected to an identification pin of the controller 20.

An emitter of the BJT Q3 is connected to the power pin VCC. A collector of the BJT Q3 is connected to the drain of the MOSFET Q2, and is further connected to a base of the BJT Q4. A base of the BJT Q3 is connected to a collector of the BJT Q4. An emitter of the BJT Q4 is grounded. The capacitor C1 is connected between the emitter and the base of the BJT Q3. The resistor R3 is connected with the capacitor C1 in parallel. The capacitor C2 is connected between the base and the emitter of the BJT Q4. The resistor R4 is connected with the capacitor C2 in parallel.

According to USB standards, a USB device includes a power pin VCC, a ground pin GND, two data pins D+ and D−. A power adapter includes a power pin VCC and a ground pin GND.

When a power adapter is connected to the USB interface 10, the positive data pin D+ of the USB interface 10 is floating. At this time, the MOSFET Q1 is turned off, and the MOSFET Q2 is turned on. The BJTs Q3 and Q4 are turned off. As a result, the identification pin of the controller 20 receives a low level signal. The controller 20 determines that the USB interface 10 is connected to the power adapter.

When the USB interface 10 is connected to the computer, the positive data pin D+ outputs a high level signal, the MOSFET Q1 is turned on, and the MOSFET Q2 is turned off. The BJTs Q3 and Q4 are turned on. As a result, the identification pin of the controller 20 receives a high level signal. The controller 20 determines that the USB interface 10 is connected to the computer to be regarded as a USB device. Furthermore, because the BJT Q3 is turned on, the drain of the MOSFET Q2 receives a high level signal from the power pin VCC of the USB interface 10 through the BJT Q3. As a result, even if the data pin D+ does not output the high level signal, the base of the BJT Q4 receives the high level signal all the same. The BJT Q3 is turned on all the time, namely the identification pin of the controller 20 receives the high level signal all the time.

In the embodiment, the MOSFETs Q1, Q2 and the BJTs Q3, Q4 function as electronic switches. Therefore, the MOSFETs Q1, Q2 and the BJTs Q3, Q4 can be replaced by any other types of FETs or BJTs.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An identifying circuit connected between a Universal Serial Bus (USB) interface and a controller, the identifying circuit comprising:

a first electronic switch, wherein a control terminal of the first electronic switch is connected to a positive data pin of the USB interface, a first terminal of the first electronic switch is connected to a power pin of the USB interface through a first resistor, a second terminal of the first electronic switch is grounded;

a second electronic switch, wherein a control terminal of the second electronic switch is connected to the first terminal of the first electronic switch, a first terminal of the second electronic switch is connected to the power pin of the USB interface through a second resistor, the first terminal of the second electronic switch is further connected to an identification pin of the controller, a second terminal of the second electronic switch is grounded;

a third electronic switch, wherein a control terminal of the third electronic switch is connected to the first terminal of the second electronic switch, a first terminal of the third electronic switch is connected to the power pin of the USB interface through a third resistor, a second terminal of the third electronic switch is grounded; and a fourth electronic switch, wherein a control terminal of the fourth electronic switch is connected to the first terminal of the third electronic switch, a first terminal of the fourth electronic switch is connected to the power pin of the USB interface, a second terminal of the fourth electronic switch is connected to the control terminal of the third electronic switch, the second terminal of the fourth electronic switch is further grounded through a fourth resistor;

wherein when a power adapter is connected to the USB interface, the first electronic switch is not turned on, the second electronic switch is turned on, the third electronic switch is not turned on, the fourth electronic switch is not turned on, the identification pin of the controller receives a low level signal and determines that the power adapter is connected to the USB interface; when the USB interface is connected to a computer, the first electronic switch is turned on, the second electronic switch is not turned on, the third electronic switch is turned on, the fourth electronic switch is turned on, the identification pin of the controller receives a high level signal and determines that the computer is connected to the USB interface.

2. The identifying circuit of claim 1, wherein the first electronic switch is a metal oxide semiconductor field effect transistor (MOSFET), a gate of the MOSFET is the control terminal of the first electronic switch, a drain of the MOSFET is the first terminal of the first electronic switch, a source of the MOSFET is the second terminal of the first electronic switch.

3. The identifying circuit of claim 1, wherein the second electronic switch is a metal oxide semiconductor field effect transistor (MOSFET), a gate of the MOSFET is the control terminal of the second electronic switch, a drain of the MOSFET is the first terminal of the second electronic switch, a source of the MOSFET is the second terminal of the second electronic switch.

4. The identifying circuit of claim 1, wherein the third electronic switch is a bipolar junction transistor (BJT), a base of the BJT is the control terminal of the third electronic switch, a collector of the BJT is the first terminal of the third electronic switch, an emitter of the BJT is the second terminal of the third electronic switch.

5. The identifying circuit of claim 1, wherein the fourth electronic switch is a bipolar junction transistor (BJT), a base of the BJT is the control terminal of the fourth electronic switch, a collector of the BJT is the first terminal of the fourth electronic switch, an emitter of the BJT is the second terminal of the fourth electronic switch.

6. The identifying circuit of claim 1, further comprising a capacitor, wherein the capacitor is connected between the second terminal and the control terminal of the third electronic switch.

7. The identifying circuit of claim 1, further comprising a capacitor, wherein the capacitor is connected between the first terminal and the control terminal of the fourth electronic switch.

* * * * *